United States Patent
Honkanen et al.

(10) Patent No.: US 9,762,873 B2
(45) Date of Patent: Sep. 12, 2017

(54) DYNAMIC CONSTANCY OF BRIGHTNESS OR SIZE OF PROJECTED CONTENT IN A SCANNING DISPLAY SYSTEM

(71) Applicant: Microvision, Inc., Redmond, WA (US)

(72) Inventors: Jari Honkanen, Monroe, WA (US); P. Selvan Viswanathan, Bellevue, WA (US)

(73) Assignee: Microvision, Inc., Redmond, WA (US)

( * ) Notice: Subject to any disclaimer, the term of this patent is extended or adjusted under 35 U.S.C. 154(b) by 13 days.

(21) Appl. No.: 14/845,698

(22) Filed: Sep. 4, 2015

(65) Prior Publication Data
US 2017/0070714 A1    Mar. 9, 2017

(51) Int. Cl.
| | | |
|---|---|---|
| H04N 9/31 | (2006.01) |
| G09G 5/10 | (2006.01) |
| G09G 5/00 | (2006.01) |
| G01S 17/08 | (2006.01) |
| G01S 17/88 | (2006.01) |
| G01S 17/42 | (2006.01) |
| G01S 7/481 | (2006.01) |

(52) U.S. Cl.
CPC ......... *H04N 9/3188* (2013.01); *G01S 7/4817* (2013.01); *G01S 17/08* (2013.01); *G01S 17/42* (2013.01); *G01S 17/88* (2013.01); *G09G 5/005* (2013.01); *G09G 5/10* (2013.01); *H04N 9/317* (2013.01); *H04N 9/3129* (2013.01); *H04N 9/3135* (2013.01); *H04N 9/3155* (2013.01); *H04N 9/3161* (2013.01); *H04N 9/3173* (2013.01); *H04N 9/3185* (2013.01); *H04N 9/3194* (2013.01); *G09G 2320/0233* (2013.01)

(58) Field of Classification Search
None
See application file for complete search history.

(56) References Cited

U.S. PATENT DOCUMENTS

| | | | |
|---|---|---|---|
| 2009/0040475 A1 | 2/2009 | Sagawa | |
| 2009/0147224 A1* | 6/2009 | Kurozuka | H04N 9/3129 353/98 |
| 2012/0120375 A1* | 5/2012 | Kilcher | G01S 7/4814 353/98 |
| 2012/0176587 A1 | 7/2012 | Waltermann et al. | |
| 2012/0242571 A1* | 9/2012 | Takamura | G09G 5/36 345/156 |
| 2014/0241533 A1* | 8/2014 | Gerrish | G08B 25/04 381/57 |
| 2014/0320829 A1 | 10/2014 | Woltman et al. | |
| 2015/0116672 A1 | 4/2015 | Woltman et al. | |

FOREIGN PATENT DOCUMENTS

KR    10-2007-0047983    5/2007

OTHER PUBLICATIONS

Microvision, Inc. "International Search Report and Written Opinion", PCT/US2016/045352, dated Nov. 11, 2016.

* cited by examiner

Primary Examiner — Michelle Chin
(74) Attorney, Agent, or Firm — Kevin D. Wills (57) ABSTRACT

A scanning projector includes a MEMS device with a scanning mirror that sweeps a beam in two dimensions. Actuating circuits receive scan angle information and provide signal stimulus to the MEMS device to control the amount of mirror deflection on two axes. The scan angle information may be modified to maintain a constant image size, a constant image brightness, and/or to correct for keystone distortion.

16 Claims, 8 Drawing Sheets

DYNAMIC CONSTANCY OF BRIGHTNESS OR SIZE OF PROJECTED CONTENT IN A SCANNING DISPLAY SYSTEM

FIELD

The present invention relates generally to display systems, and more specifically to scanning display systems.

BACKGROUND

Scanning display systems typically scan a light beam in a raster pattern to project an image made up of pixels that lie on the scan trajectory of the raster pattern. The size of the display produced by scanning display systems is typically a function of the distance between the projector and the display surface, as well as the angular extents of vertical and horizontal mirror deflection.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
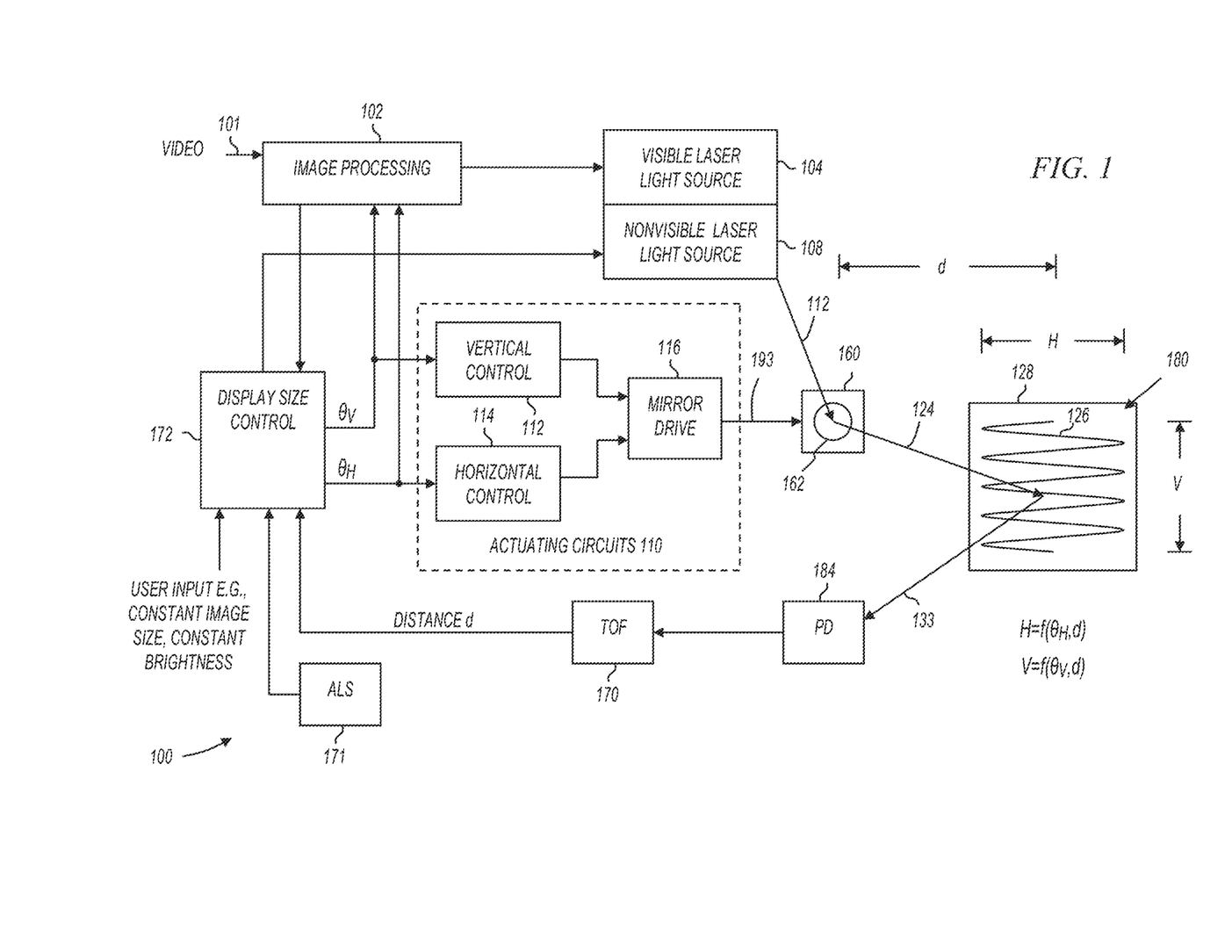
FIG. 1 shows a scanning display system in accordance with various embodiments of the present invention.

FIG. 1 shows a scanning display system in accordance with various embodiments of the present invention. System 100 includes image processing component 102, visible laser light source 104, nonvisible laser light source 108, microelectromechanical system (MEMS) device 160 having scanning mirror 162, and actuating circuits 110. Actuating circuits 110 include vertical control component 112, horizontal control component 114, and mirror drive component 116. System 100 also includes photodetector (PD) 184, time-of-flight (TOF) detection circuit 170, display size control circuit 172, and ambient light sensor (ALS) 171.

In operation, image processing component 102 receives video data on node 101 and produces display pixel data to drive visible laser light source 104 when pixels are to be displayed. Visible laser light source 104 receives display pixel data and produces light having grayscale values in response thereto. Visible laser light source 104 may be monochrome or may include multiple different color light sources. For example, in some embodiments, visible laser light source 104 includes red, green, and blue light sources. In these embodiments, image processing component 102 outputs display pixel data corresponding to each of the red, green, and blue light sources.

The video data 101 represents image source data that is typically received with pixel data on a rectilinear grid, but this is not essential. For example, video data 101 may represent a grid of pixels at any resolution (e.g., 640×480, 848×480, 1920×1080). Scanning display system 100 includes a scanning projector that scans a raster pattern. The raster pattern does not necessarily align with the rectilinear grid in the image source data, and image processing component 102 operates to produce display pixel data that will be displayed at appropriate points on the raster pattern. For example, in some embodiments, image processing component 102 interpolates vertically and/or horizontally between pixels in the source image data to determine display pixel values along the scan trajectory of the raster pattern.

Light sources 104 and 108 may be laser light sources such as laser diodes or the like, capable of emitting a laser beam 112. The beam 112 impinges on a scanning mirror 162 to generate a controlled output beam 124. In some embodiments, optical elements are included in the light path between light sources 104, 108 and mirror 162. For example, scanning display system 100 may include collimating lenses, dichroic mirrors, or any other suitable optical elements.

Actuating circuits 110 provides one or more drive signal(s) 193 to control the angular motion of scanning mirror 162 to cause output beam 124 to generate a raster scan 126 on a projection surface 128. In operation, light sources 104 and/or 108 produce light pulses and scanning mirror 162 reflects the light pulses as beam 124 traverses raster scan 126.

In some embodiments, raster scan 126 is formed by combining a sinusoidal component on the horizontal axis and a sawtooth component on the vertical axis. In these embodiments, controlled output beam 124 sweeps back and forth left-to-right in a sinusoidal pattern, and sweeps vertically (top-to-bottom) in a sawtooth pattern with the display blanked during flyback (bottom-to-top). FIG. 1 shows the sinusoidal pattern as the beam sweeps vertically top-to-bottom, but does not show the flyback from bottom-to-top. In other embodiments, the vertical sweep is controlled with a triangular wave such that there is no flyback. In still further embodiments, the vertical sweep is sinusoidal. The various embodiments of the present invention are not limited by the waveforms used to control the vertical and horizontal sweep or the resulting raster pattern.

In some embodiments, visible laser light source 104 and nonvisible laser light source 108 may include one or more laser light producing devices. For example, in some embodiments, visible laser light source 104 and nonvisible laser light source 108 may include laser diodes. In these embodiments, visible laser light source 104 also includes driver circuits that accept the display pixel values and produce current signals to drive the laser diodes, and nonvisible laser light source 108 also includes driver circuits that accept a drive signal from display size control circuit 172 when nonvisible laser light pulses are to be generated.

Although display size control circuit 172 is shown driving nonvisible laser light source 108, this is not a limitation of the present invention. For example, in some embodiments, display size control circuit 172 drives one or more visible laser light sources, and PD 184 is sensitive to the visible wavelengths used.

In some embodiments, nonvisible laser light source 108 sources nonvisible light such as infrared (IR) light. In these embodiments, PD 184 is able to detect the same wavelength of nonvisible light. For example, in some embodiments, laser light source 108 may be an IR laser diode that produces light with a wavelength of substantially 808 nanometers (nm). The wavelength of light is not a limitation of the present invention. Nonvisible laser light source 108 may produce any wavelength of nonvisible light without departing from the scope of the present invention.

MEMS device 160 is an example of a scanning mirror assembly that scans light in two dimensions. In some embodiments the scanning mirror assembly includes a single mirror that scans in two dimensions (e.g., on two axes). Alternatively, in some embodiments, MEMS device 160 may be an assembly that includes two scan mirrors, one that deflects the beam along one axis, and another that deflects the beam along a second axis largely perpendicular to the first axis.

The resultant display has a height (V) and a width (H) that are a function of the distance (d) from scanning mirror 162 to the projection surface, as well as the angular extents of mirror deflection. As used herein, the term "angular extents" refers to the total angle through which the mirror deflects rather than an instantaneous angular displacement of the mirror. The width (H) is a function of the distance (d) and the horizontal angular extents ($\theta_H$). This relationship is shown in FIG. 1 as $$H = f(\theta_H, d). \quad (1)$$

The height (V) is a function of the distance (d) and the vertical angular extents ($\theta_V$). This relationship is shown in FIG. 1 as $$V = f(\theta_V, d). \quad (2)$$

In various embodiments of the present invention, either or both of the vertical and horizontal scan angles are dynamically modified during operation of the scanning projection apparatus to accomplish various results. Example results include maintaining a constant image size of the resultant display as the distance (d) changes, maintaining image brightness of the resultant display as the distance (d) changes, and/or correcting for keystone distortion.

As shown in FIG. 1, horizontal control component 114 receives signal stimulus that represents the horizontal angular extents, and vertical control component 112 receives signal stimulus that represents the vertical angular extents. The angular extents signal stimulus may be provided on multiple signal lines (e.g., dedicated signal lines, or a shared bus) or may be provided on a single signal line (e.g., a serial bus). The manner in which signal stimulus is provided is not a limitation of the present invention.

Horizontal control component 114 and vertical control component 112 receive the angular extents signal stimulus and produce signals to effect actual mirror movement through the specified angles. The signals produced by vertical control component 112 and horizontal control component 114 are combined by mirror drive component 116, which drives MEMS device 160 with a composite signal on node 193. In some embodiments that include two scan mirrors, MEMS device 160 is driven directly by signals produced by vertical control component 112 and horizontal control component 114.

Actuating circuits 110 are implemented using functional circuits such as voltage or current sources, op-amps, bridge circuits (and all in open or closed loop control with or without position sensing circuits), phase locked loops (PLLs), filters, adders, multipliers, registers, processors, memory, and the like. Accordingly, actuating circuits 110 may be implemented in hardware, software, or in any combination. For example, in some embodiments, actuating circuits 110 are implemented in an application specific integrated circuit (ASIC). Further, in some embodiments, some of the faster data path control is performed in an ASIC and overall control is software programmable.

The horizontal and vertical angular extents are controlled by display size controller 172. In operation, display size controller may dynamically modify the angular extents of mirror deflection in response to user input as well as in response to distance information received from TOF detection circuit 170 and/or ambient light sensor 171. For example, display size controller 172 may accept user input to allow a user to specify a particular image size or a particular image brightness. Also for example, display size controller 172 may modify the angular extents of mirror deflection to maintain a constant image size or constant image brightness as the distance (d) changes or as the ambient light level changes. Further, display size controller 172 may provide for variable angular extents of mirror deflection to correct for keystone distortion of the displayed image.

Time-of-flight (TOF) detection circuit 170 receives IR laser light pulses that are reflected off projection surface 128. TOF detection circuit 170 compares the timing of a received reflected IR pulse with timing of the IR pulse emitted from nonvisible laser light source 108 to determine the TOF of the IR pulse, thereby measuring the distance to the point on the projection surface from which the IR light pulse reflected.

TOF detection circuit 170 may be implemented using any suitable circuits. For example, in some embodiments, TOF detection circuit 170 includes an analog integrator that is reset when the IR pulse is launched, and is stopped when the reflected pulse is received. TOF detection circuit 170 may also include an analog-to-digital converter to convert the analog integrator output to a digital value that corresponds to the time-of-flight (TOF) of the IR laser pulse, which in turn corresponds to the distance between system 100 and the point on projection surface 128 from which the light pulse reflected.

Display size control circuit 172 receives user input. For example, in some embodiments, system 100 includes a user interface that allows a user to specify a constant display size or constant brightness of resultant display 180. The user interface may incorporate a touchscreen, a menu, a button, gesture recognition or the like.

In operation, display size control circuit 172 commands nonvisible laser light source 108 to emit nonvisible light pulses at one or more locations of raster scan 126 to measure the distance to one or more points on projection surface 128, and then modifies the angular extents $\theta_H$ and $\theta_V$ to maintain either constant display size or constant brightness depending on user input.

Display size control circuit 172 may also correct for keystone distortion of the resultant display 180 by modifying one or both of the angular extents $\theta_H$ and $\theta_V$. For example, in some embodiments, display size control circuit 172 may command nonvisible laser light source 108 to emit IR laser light pulses at two, three, or more points on raster scan 126 to measure the distance to two, three, or more points on projection surface 128. If the distance to the two, three, or more points are not substantially equal, then display size control circuit 172 may determine the amount of keystone distortion caused by the unequal distances, and correct for the keystone distortion by modifying one or both of the angular extents $\theta_H$ and $\theta_V$.

In some embodiments, display size control circuit 172 continuously measures the distance to multiple points on projection surface 128. The distance to the multiple points may be averaged to determine the distance (d) used to modify the image size, and only when the distances to the multiple points diverge beyond a threshold is the keystone correction employed.

In some embodiments, display size control circuit 172 continuously receives information describing the ambient light level from ambient light sensor 171. The ambient light level information received over time may be averaged to determine an average ambient light level, and the horizontal and vertical extents may be modified to maintain a substantially constant brightness.

Display size control circuit 172 are implemented using functional circuits such as phase lock loops (PLLs), filters, adders, multipliers, registers, processors, memory, and the like. Accordingly, display size control circuit 172 may be implemented in hardware, software, or in any combination. For example, in some embodiments, display size control circuit 172 is implemented in an application specific integrated circuit (ASIC). Further, in some embodiments, some of the faster data path control is performed in an ASIC and overall control is software programmable.

Figure 2:
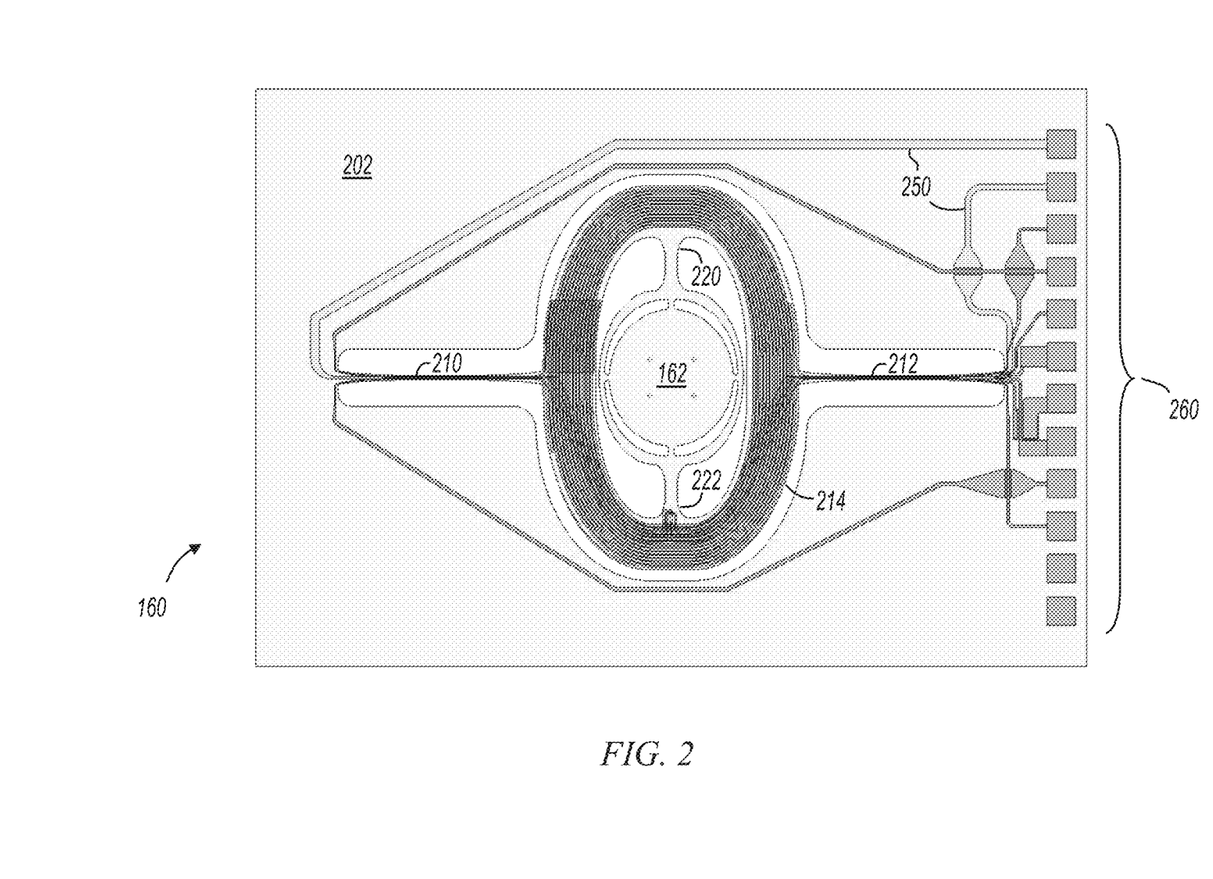
FIG. 2 shows a plan view of a microelectromechanical system (MEMS) device with a scanning mirror.

FIG. 2 shows a plan view of a microelectromechanical system (MEMS) device with a scanning mirror. MEMS device 160 includes fixed platform 202, scanning platform 214 and scanning mirror 162. Scanning platform 214 is coupled to fixed platform 202 by flexures 210 and 212, and scanning mirror 162 is coupled to scanning platform 214 by flexures 220 and 222. Scanning platform 214 has a drive coil connected to drive lines 250, which are driven by a composite signal provided on node 193 from actuating circuits 110 (FIG. 1). Current driven into drive lines 250 produces a current in the drive coil. Two of the interconnects 260 are coupled to drive lines 250.

In operation, an external magnetic field source (not shown) imposes a magnetic field on the drive coil. The magnetic field imposed on the drive coil by the external magnetic field source has a component in the plane of the coil, and is oriented non-orthogonally with respect to the two drive axes. The in-plane current in the coil windings interacts with the in-plane magnetic field to produce out-of-plane Lorentz forces on the conductors. Since the drive current forms a loop on scanning platform 214, the current reverses sign across the scan axes. This means the Lorentz forces also reverse sign across the scan axes, resulting in a torque in the plane of and normal to the magnetic field. This combined torque produces responses in the two scan directions depending on the frequency content of the torque.

The long axis of flexures 210 and 212 form a pivot axis. Flexures 210 and 212 are flexible members that undergo a torsional flexure, thereby allowing scanning platform 214 to rotate on the pivot axis and have an angular displacement relative to fixed platform 202. Flexures 210 and 212 are not limited to torsional embodiments as shown in FIG. 2. For example, in some embodiments, flexures 210 and 212 take on other shapes such as arcs, "S" shapes, or other serpentine shapes. The term "flexure" as used herein refers to any flexible member coupling a scanning platform to another platform (scanning or fixed), and capable of movement that allows the scanning platform to have an angular displacement with respect to the other platform.

Mirror 162 pivots on a first axis formed by flexures 220 and 222, and pivots on a second axis formed by flexures 210 and 212. The first axis is referred to herein the horizontal axis, and the second axis is referred to herein as the vertical axis. The distinction between vertical and horizontal is somewhat arbitrary, since a rotation of the display system will cause a rotation of the two axes. Accordingly, the various embodiments of the present invention are not to be limited by the terms "horizontal" and "vertical."

In some embodiments, scanning mirror 162 scans at a mechanically resonant frequency on the horizontal axis resulting in a sinusoidal horizontal sweep. Further, in some embodiments, scanning mirror 162 scans vertically at a nonresonant frequency, so the vertical scan frequency can be controlled independently.

In various embodiments of the present invention, the angular extents of mirror deflection of mirror 162 are modified during operation. For example, the horizontal angular extents may be modified, the vertical angular extents may be modified, or both may be modified. The angular extents may be controlled and modified by signal stimulus received on drive lines 250. This signal stimulus is provided on node 193 by actuating circuits 110 (FIG. 1).

The particular MEMS device embodiment shown in FIG. 2 is provided as an example, and the various embodiments of the invention are not limited to this specific implementation. For example, any scanning mirror capable of sweeping in two dimensions to reflect a light beam in a raster pattern may be incorporated without departing from the scope of the present invention. Also for example, any combination of scanning mirrors (e.g., two mirrors: one for each axis) may be utilized to reflect a light beam in a raster pattern. Further, any type of mirror drive mechanism may be utilized without departing from the scope of the present invention. For example, although MEMS device 160 uses a drive coil on a moving platform with a static magnetic field, other embodiments may include a magnet on a moving platform with drive coil on a fixed platform. Further, the mirror drive mechanism may include an electrostatic drive mechanism.

Figure 3:
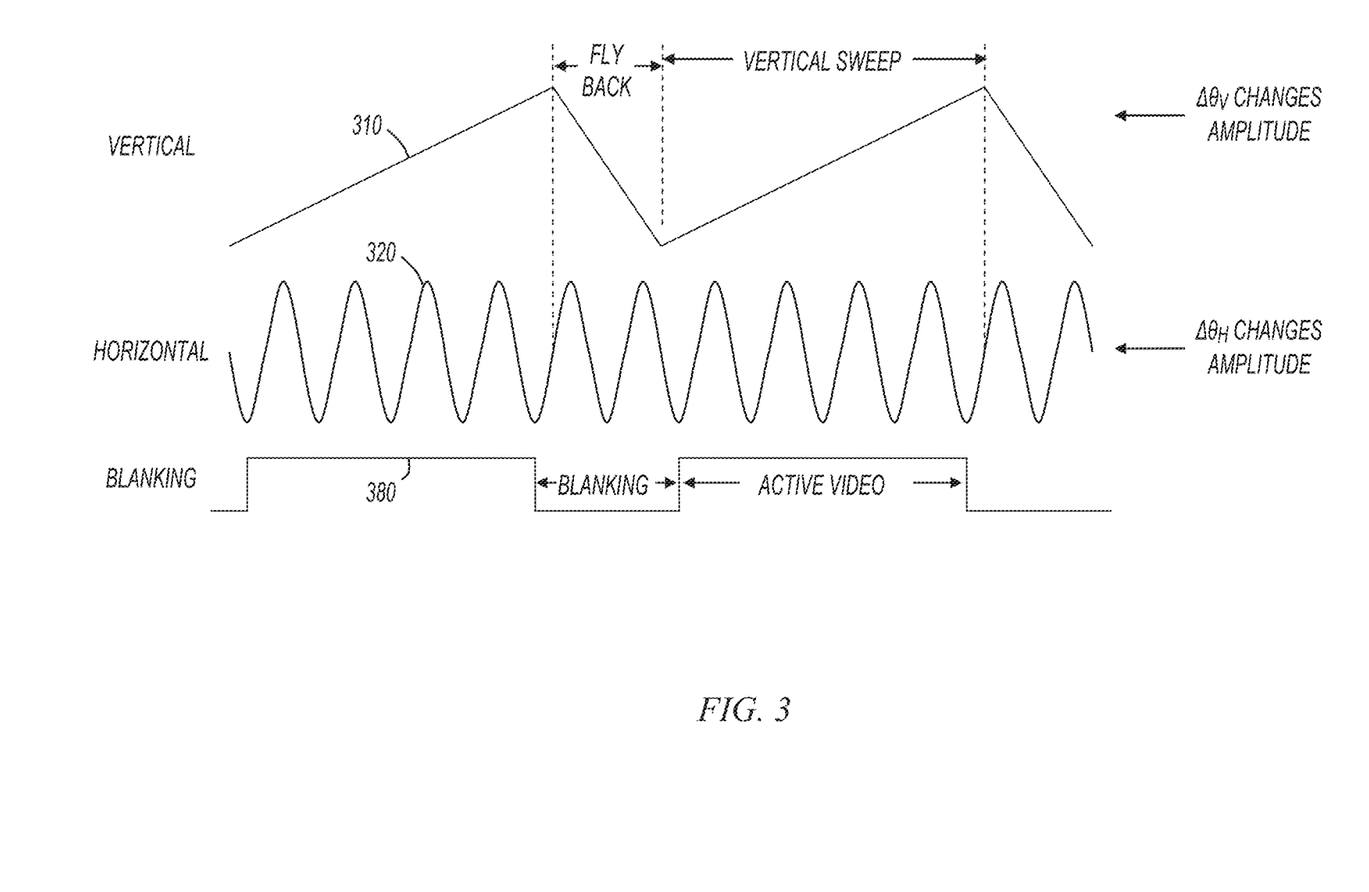
FIG. 3 shows deflection waveforms resulting from a linear vertical trajectory and a sinusoidal horizontal trajectory.

FIG. 3 shows example waveforms suitable for the operation of the scanning display system of FIG. 1. Vertical deflection waveform 310 is a sawtooth waveform, and horizontal deflection waveform 320 is a sinusoidal waveform. When mirror 162 is deflected on its vertical and horizontal axes according to the waveforms 310 and 320, the scanned beam trajectory shown in the left side of FIGS. 4 and 6 results.

Deflection of mirror 162 according to waveforms 310 and 320 may be achieved by driving MEMS device 160 with the appropriate drive signals. In some embodiments, the horizontal deflection frequency is at a resonant frequency of the mirror and a very small excitation at that frequency will result in the desired scan angle. A sawtooth drive signal for the vertical deflection may be derived from a sum of sine waves at various frequencies. The drive signal for the vertical deflection may also be derived from specific points programmed into a waveform generator.

Although a sawtooth drive signal will result in the vertical deflection shown in FIG. 3, other drive signal embodiments exist. For example, in some embodiments, the vertical drive signal may be triangle wave (where subsequent frames are written top to bottom followed by bottom to top alternating each frame) or sinusoidal waveforms.

Sawtooth vertical deflection waveform 310 includes vertical sweep portions and flyback portions. In some embodiments, pixels are displayed during the vertical sweep portions, and not during the flyback portions. The flyback portions correspond to the beam "flying back" to the top of the image field of view. Blanking waveform 380 is also shown in FIG. 3. The scanned beam is blanked (no pixels are displayed) during flyback, and is not blanked during the vertical sweep.

For clarity of explanation, FIG. 3 shows only a few horizontal cycles per vertical sweep. In practice, many more horizontal cycles are present. For example, a horizontal resonant frequency of 24.5 kHz and a frame rate of 60 Hz will yield about 408 horizontal cycles per vertical sweep.

The amplitude of horizontal deflection waveform 320 corresponds to the horizontal angular extent of mirror deflection. As the amplitude increases, the angular extent of mirror deflection also increases. Referring now back to FIG. 1, as $\theta_H$ increases, actuating circuits 110 provide stimulus to MEMS 160 that causes the amplitude of horizontal deflection waveform 320 to increase. Stated generally, a change in $\theta_H$ ($\Delta\theta_H$) results in a change in the amplitude of the horizontal deflection waveform 320. Similarly, the amplitude of vertical deflection waveform 310 corresponds to the vertical angular extent of mirror deflection. As the amplitude increases, the angular extent of mirror deflection also increases. Referring now back to FIG. 1, as $\theta_V$ increases, actuating circuits 110 provide stimulus to MEMS 160 that causes the amplitude of vertical deflection waveform 310 to increase. Stated generally, a change in $\theta_V$ ($\Delta\theta_V$) results in a change in the amplitude of the vertical deflection waveform 310.

Figure 4:
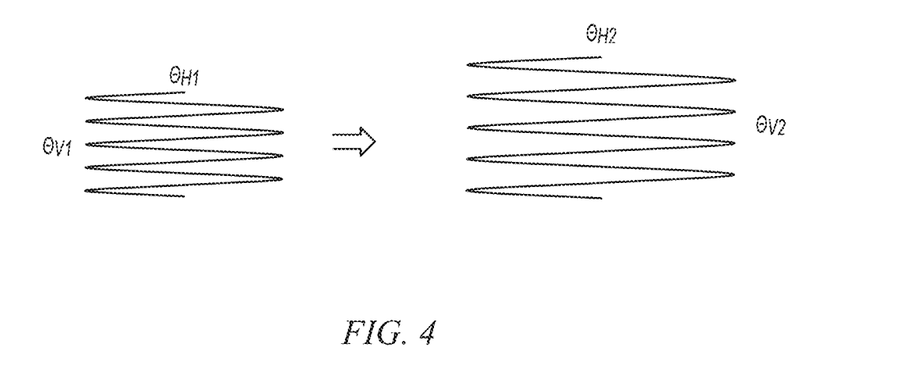
FIG. 4 shows and example of dynamic modification of angular extents of mirror deflection maintain constant image size or brightness.

Referring now to FIG. 4, FIG. 4 shows an example of dynamic modification of angular extents of mirror deflection to maintain constant image size or brightness. The left side of FIG. 4 shows a raster pattern with a first horizontal angular extent $\theta_{H1}$ and first vertical angular extent $\theta_{V1}$. The right side of FIG. 4 shows the pattern when the horizontal angular extent is increased to $\theta_{H2}$ and the vertical angular extent is increased to $\theta_{V2}$. Referring now back to FIG. 3, this corresponds to an increase in the amplitude of vertical deflection waveform 310, and an increase in the amplitude of horizontal deflection waveform 320.

The change shown in FIG. 4 may result from a user specifying constant size or brightness and a decrease in the distance d. The raster pattern is shown with larger angular extents; however the resultant display 180 will appear to the user to be substantially the same size because the scanning display system is closer to the projection surface.

Figure 5:
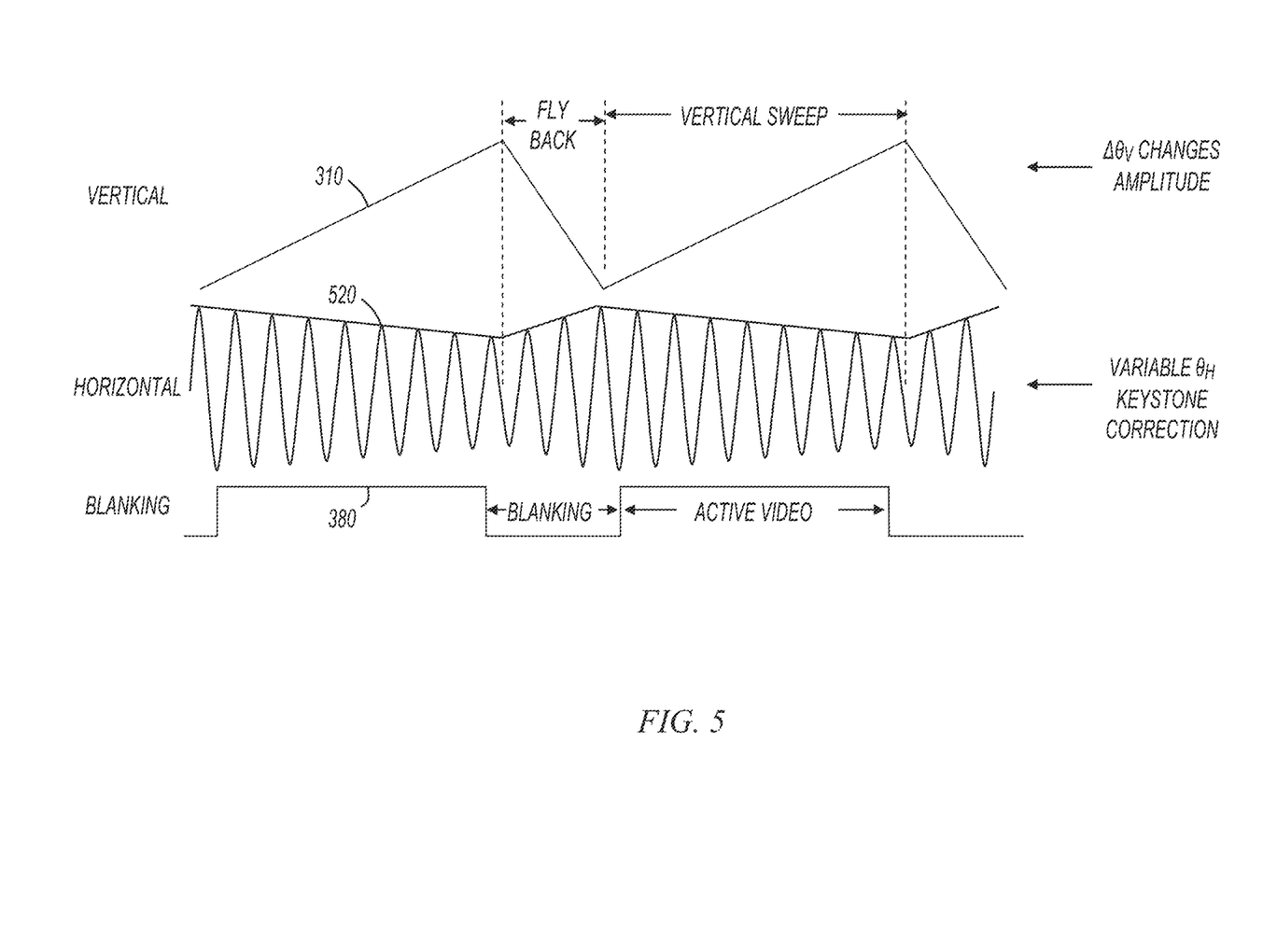
FIG. 5 shows deflection waveforms resulting from a linear vertical trajectory and a sinusoidal horizontal trajectory with a variable amplitude.

FIG. 5 shows deflection waveforms resulting from a linear vertical trajectory and a sinusoidal horizontal trajectory with a variable amplitude. Vertical deflection waveform and blanking waveform 380 are described above with reference to FIG. 3. Horizontal waveform 520 has a variable amplitude, which corresponds to a varying horizontal angular extent as the vertical sweep of the raster scan progresses. In some embodiments, the variable horizontal angular extent $\theta_H$ corrects for keystone distortion detected by display size control circuit 172 (FIG. 1).

Deflection of mirror 162 according to waveforms 310 and 520 may be achieved by driving MEMS device 160 with the appropriate drive signals. In some embodiments, the horizontal deflection frequency is at a resonant frequency of the mirror and a very small excitation at that frequency will result in the desired scan angle. A sawtooth drive signal for the vertical deflection may be derived from a sum of sine waves at various frequencies. The drive signal for the vertical deflection may also be derived from specific points programmed into a waveform generator.

Figure 6:
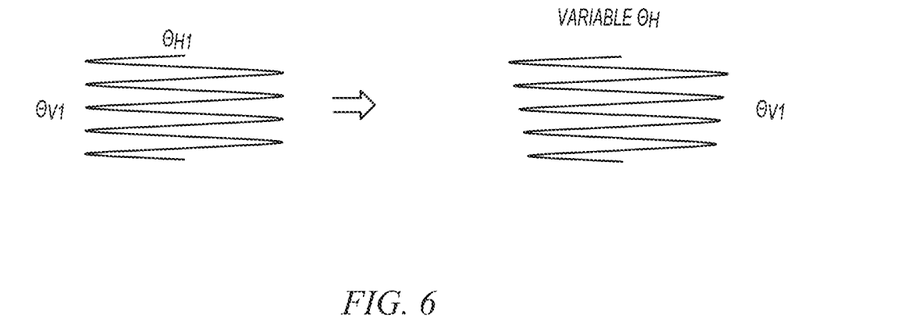
FIG. 6 shows an example of dynamic modification of angular extents of mirror deflection to correct for keystone distortion.

Referring now to FIG. 6, FIG. 6 shows an example of dynamic modification of angular extents of mirror deflection to correct for keystone distortion. The left side of FIG. 6 shows a raster pattern with a first horizontal angular extent $\theta_{H1}$ and first vertical angular extent $\theta_{V1}$. The right side of FIG. 6 shows the pattern when the horizontal angular extent has been modified to have a variable value across the vertical sweep. Referring now back to FIG. 5, this corresponds to the horizontal extent $\theta_H$ having a variable amplitude as shown at 520.

The change shown in FIG. 6 may result from display size control circuit 172 determining that keystone distortion is present by measuring the distance to the projection surface at multiple points. The raster pattern in FIG. 6 is shown with a variable horizontal angular extent, however the resultant display 180 will appear to the user to be substantially the same size and shape because the variable $\theta_H$ is used to correct for keystone distortion that would otherwise be present. In some embodiments, the angular extents of mirror deflection are modified to simultaneously accomplish constant image size or brightness as well as keystone distortion correction. For example, the angular extents modifications shown in FIGS. 4 and 6 may be combined in a single operation.

In some embodiments, keystone distortion is corrected digitally within image processing component 102 (FIG. 1) without varying the horizontal angular extent $\theta_H$.

Figure 7:
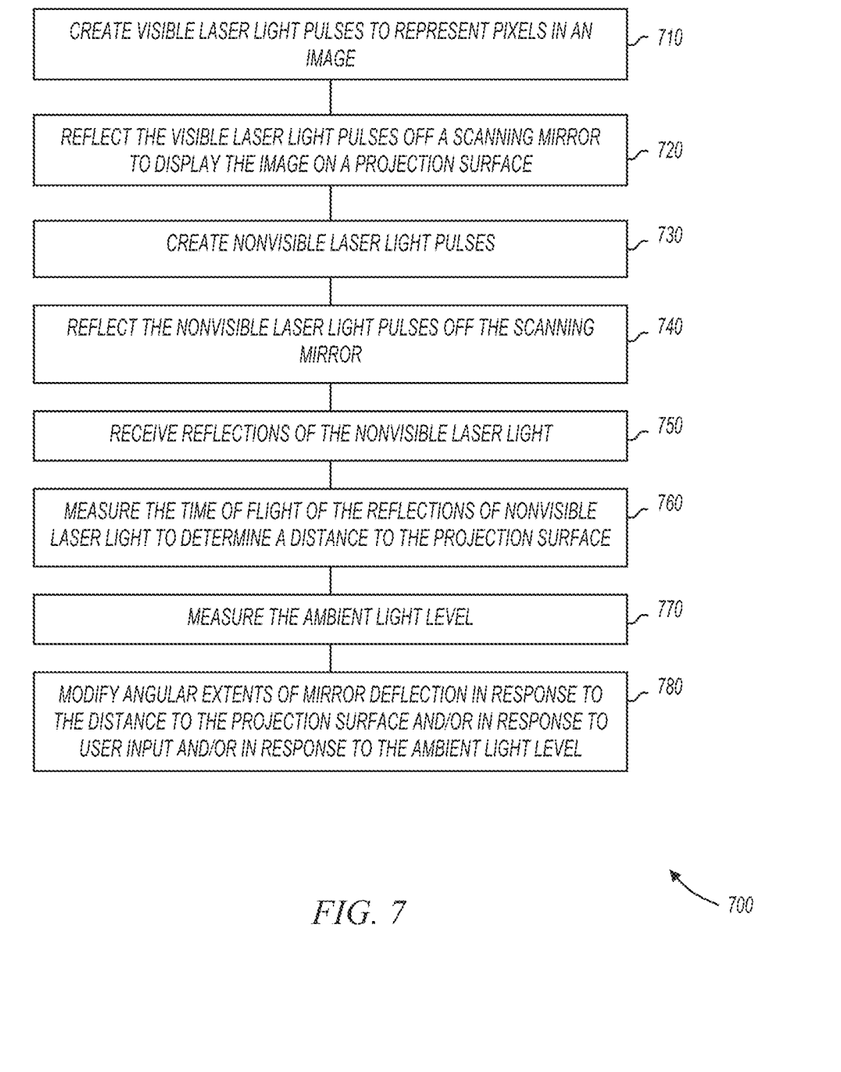
FIG. 7 shows a flow diagram of a method in accordance with various embodiments of the present invention.

FIG. 7 shows a flow diagram of methods in accordance with various embodiments of the present invention. In some embodiments, method 700, or portions thereof, is performed by a display size control circuit, embodiments of which are shown in previous figures. Further, in some embodiments, method 700, or portions thereof, is performed by a scanning display system, embodiments of which are shown in previous figures. In other embodiments, method 700 is performed by a series of circuits or an electronic system. Method 700 is not limited by the particular type of apparatus performing the method. The various actions in method 700 may be performed in the order presented, or may be performed in a different order. Further, in some embodiments, some actions listed in FIG. 7 are omitted from method 700.

Method 700 is shown beginning with block 710. As shown at 710, visible laser light pulses to represent pixels in an image are created. This may correspond to image processing component 102 commanding visible laser light source 104 to generate grayscale valued red, green, and blue laser light pulses. At 720, the visible laser light pulses are reflected off a scanning mirror to display the image on a projection surface. This may correspond to the laser light pulses being reflected off mirror 162 and illuminating pixels along raster scan 126 as mirror 162 deflects on two axes.

At 730, nonvisible laser light pulses are created. This may correspond to display size control circuit 172 commanding nonvisible laser light source 108 to generate one or more nonvisible laser light pulses that will be placed at one or more locations along raster scan 126. At 740, the nonvisible laser light pulses are reflected off the scanning mirror.

At 750, reflections of the nonvisible laser light pulses are received. This may correspond to PD 184 receiving reflections of the laser light pulses created at 730 and reflected off the projection surface at 740.

At 760, the time of flight of the reflections of nonvisible laser light pulses are measured to determine a distance to the projection surface. This may correspond to TOF detection circuit 170 measuring the TOF of the reflected laser light pulses. In some embodiments, one TOF is measured per raster scan, and in other embodiments, multiple TOFs are measured per raster scan.

At 770, an ambient light level is measured. In some embodiments, this corresponds to ambient light sensor 171 (FIG. 1) measuring ambient light and providing information describing ambient light levels to display size control circuit 172.

At 780, angular extents of mirror deflection are modified in response to one or more of the measured distance(s) to the projection surface, user input, and ambient light levels. This corresponds to display size control circuit 172 modifying the angular extents $\theta_H$ and $\theta_V$. For example, if a user has selected a constant image size or a constant image brightness, the angular extents may be increased as the distance to the projection surface decreases. Also for example, if a user has selected a constant image brightness, the angular extents may be increased as the ambient level decreases. Further, if the user has selected keystone correction, one or both of the angular extents may be made to vary to correct for keystone distortion.

Figure 8:
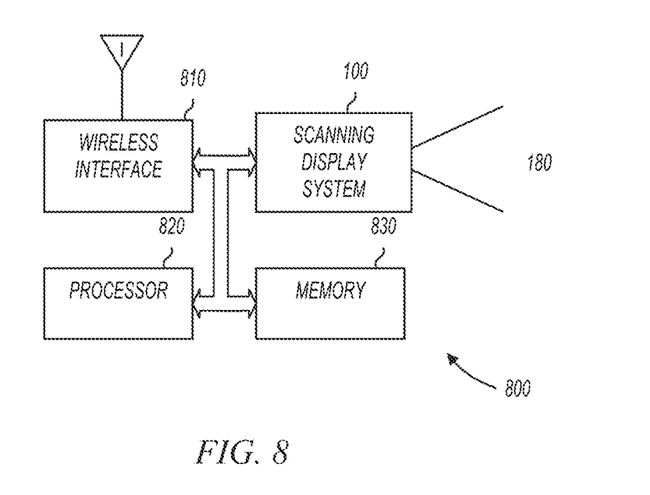
FIG. 8 shows a block diagram of a mobile device in accordance with various embodiments of the present invention.

FIG. 8 shows a block diagram of a mobile device in accordance with various embodiments of the present invention. As shown in FIG. 8, mobile device 800 includes wireless interface 810, processor 820, memory 830, and scanning display system 100. Scanning display system 100 includes TOF distance measurement, constant image size control, constant brightness control, and keystone distortion correction as described above.

Scanning display system 100 may receive image data from any image source. For example, in some embodiments, scanning display system 100 includes memory that holds still images. In other embodiments, scanning display system 100 includes memory that includes video images. In still further embodiments, scanning display system 100 displays imagery received from external sources such as connectors, wireless interface 810, a wired interface, or the like.

Wireless interface 810 may include any wireless transmission and/or reception capabilities. For example, in some embodiments, wireless interface 810 includes a network interface card (NIC) capable of communicating over a wireless network. Also for example, in some embodiments, wireless interface 810 may include cellular telephone capabilities. In still further embodiments, wireless interface 810 may include a global positioning system (GPS) receiver. One skilled in the art will understand that wireless interface 810 may include any type of wireless communications capability without departing from the scope of the present invention.

Processor 820 may be any type of processor capable of communicating with the various components in mobile device 800. For example, processor 820 may be an embedded processor available from application specific integrated circuit (ASIC) vendors, or may be a commercially available microprocessor. In some embodiments, processor 820 provides image or video data to scanning display system 100. The image or video data may be retrieved from wireless interface 810 or may be derived from data retrieved from wireless interface 810. For example, through processor 820, scanning display system 100 may display images or video received directly from wireless interface 810. Also for example, processor 820 may provide overlays to add to images and/or video received from wireless interface 810, or may alter stored imagery based on data received from wireless interface 810 (e.g., modifying a map display in GPS embodiments in which wireless interface 810 provides location coordinates).

Figure 9:
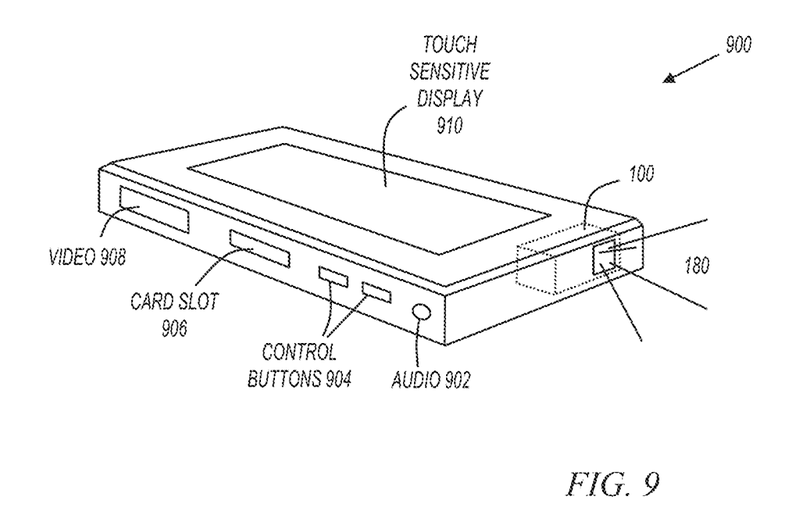
FIG. 9 shows a mobile device in accordance with various embodiments of the present invention.

FIG. 9 shows a mobile device in accordance with various embodiments of the present invention. Mobile device 900 may be a hand held scanning display system with or without communications ability. For example, in some embodiments, mobile device 900 may be a scanning display system with little or no other capabilities. Also for example, in some embodiments, mobile device 900 may be a device usable for communications, including for example, a cellular phone, a smart phone, a tablet computing device, a global positioning system (GPS) receiver, or the like. Further, mobile device 900 may be connected to a larger network via a wireless (e.g., cellular), or this device can accept and/or transmit data messages or video content via an unregulated spectrum (e.g., WiFi) connection.

Mobile device 900 includes scanning display system 100, touch sensitive display 910, audio port 902, control buttons 904, card slot 906, and audio/video (A/V) port 908. None of these elements are essential. For example, mobile device 900 may only include scanning display system 100 without any of touch sensitive display 910, audio port 902, control buttons 904, card slot 906, or A/V port 908. Some embodiments include a subset of these elements. For example, an accessory projector may include scanning display system 100, control buttons 904 and A/V port 908. A smartphone embodiment may combine touch sensitive display device 910 and display system 100.

Touch sensitive display 910 may be any type of display. For example, in some embodiments, touch sensitive display 910 includes a liquid crystal display (LCD) screen. In some embodiments, display 910 is not touch sensitive. Display 910 may or may not always display the image projected by scanning display system 100. For example, an accessory product may always display the projected image on display 910, whereas a mobile phone embodiment may project a video while displaying different content on display 910. Some embodiments may include a keypad in addition to touch sensitive display 910.

A/V port 908 accepts and/or transmits video and/or audio signals. For example, A/V port 908 may be a digital port, such as a high definition multimedia interface (HDMI) interface that accepts a cable suitable to carry digital audio and video data. Further, A/V port 908 may include RCA jacks to accept or transmit composite inputs. Still further, A/V port 908 may include a VGA connector to accept or transmit analog video signals. In some embodiments, mobile device 900 may be tethered to an external signal source through A/V port 908, and mobile device 900 may project content accepted through A/V port 908. In other embodiments, mobile device 900 may be an originator of content, and A/V port 908 is used to transmit content to a different device.

Audio port 902 provides audio signals. For example, in some embodiments, mobile device 900 is a media recorder that can record and play audio and video. In these embodiments, the video may be projected by scanning display system 100 and the audio may be output at audio port 902.

Mobile device 900 also includes card slot 906. In some embodiments, a memory card inserted in card slot 906 may provide a source for audio to be output at audio port 902 and/or video data to be projected by scanning display system 100. Card slot 906 may receive any type of solid state memory device, including for example secure digital (SD) memory cards.

Figure 10:
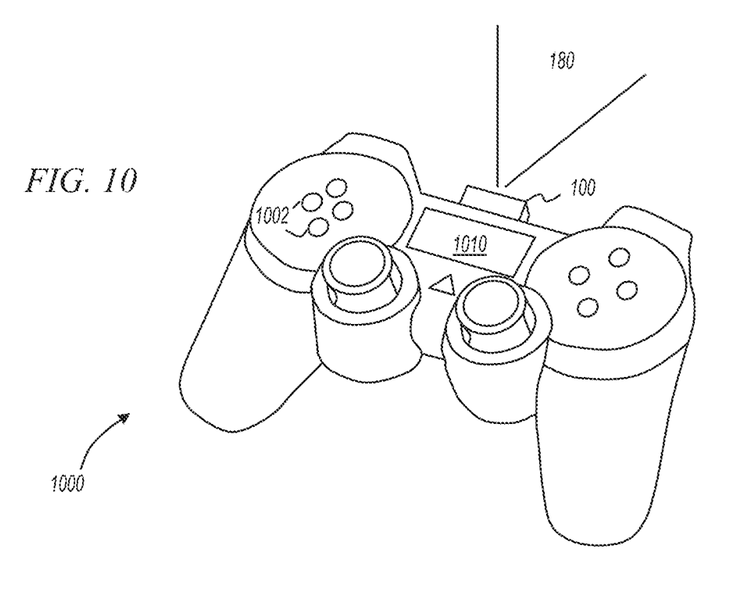
FIG. 10 shows a gaming apparatus in accordance with various embodiments of the present invention.

FIG. 10 shows a gaming apparatus in accordance with various embodiments of the present invention. Gaming apparatus 1000 includes buttons 1002, display 1010, and display system 100. In some embodiments, gaming apparatus 1000 is a standalone apparatus that does not need a larger console for a user to play a game. For example, a user may play a game while watching display 1010 and/or the projected content at 180. In other embodiments, gaming apparatus 1000 operates as a controller for a larger gaming console. In these embodiments, a user may watch a larger screen tethered to the console in combination with watching display 1010 and/or projected content at 180.

In some embodiments, gaming apparatus 1000 includes some or all of mobile device 800 (FIG. 8). For example, gaming apparatus 1000 may include one or more of wireless interface 810, processor 820, memory 830, and scanning display system 100.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A scanning display system comprising:
   a first laser light source to emit first laser light;
   a second laser light source to emit second laser light;
   a scanning mirror to reflect and scan the first laser light received from the first laser light source and the second laser light from the second laser light source and to create a visible image on a projection surface;
   a photodetector to detect the second laser light reflected off the projection surface;
   a time-of-flight (TOF) detection circuit responsive to the photodetector to measure distances from the scanning display system to multiple points on the projection surface;
   a mirror actuating circuit to drive the mirror with signals that cause the mirror to deflect through angular extents in two dimensions; and
   a display size control circuit to average the distances from the scanning display system to the multiple points, and to modify the angular extents of mirror deflection based on the average to maintain a constant display size on the projection surface.

2. The scanning display system of claim 1 wherein the display size control circuit is responsive to user input.

3. The scanning display system of claim 1 wherein the display size control circuit is configured to determine when the distances from the scanning display system to the multiple points diverge beyond a threshold to determine if keystone distortion is present.

4. The scanning display system of claim 3 wherein the display size control circuit is configured to modify angular extents of mirror deflection to correct keystone distortion.

5. The scanning display system of claim 1 wherein the second laser light source comprises an infrared laser light source.

6. The scanning display system of claim 1 wherein the first laser light source comprises at least one visible laser light source.

7. A scanning display system comprising:
   at least one visible laser light source;
   at least one nonvisible laser light source;
   a scanning mirror to reflect and scan light received from the at least one visible laser light source and the at least one nonvisible laser light source and create a visible image on a projection surface;
   a photodetector to detect nonvisible laser light reflected off the projection surface;
   a time-of-flight (TOF) detection circuit responsive to the photodetector to measure distances from the scanning display system to multiple points on the projection surface;
   an ambient light sensor to provide ambient light level information;
   a mirror actuating circuit to drive the mirror with signals that cause the mirror to deflect through angular extents in two dimensions; and
   a display size control circuit to average the distances from the scanning display system to the multiple points to determine an average distance, to average the ambient light level information received over time to determine an average ambient light level, and to modify the angular extents of mirror deflection in response to the average distance and the average ambient light level to maintain a constant display size and a constant image brightness on the projection surface.

8. The scanning display system of claim 7 wherein the display size control circuit is responsive to user input.

9. The scanning display system of claim 7 wherein the display size control circuit is configured to determine if keystone distortion is present.

10. The scanning display system of claim 9 wherein the display size control circuit is configured to modify angular extents of mirror deflection to correct keystone distortion.

11. The scanning display system of claim 7 wherein the at least one nonvisible laser light source comprises an infrared laser light source.

12. The scanning display system of claim 7 wherein the at least one visible laser light source comprises one or more red laser light sources, one or more green laser light sources, and one or more blue laser light sources.

13. A method of operating a scanning display system comprising:
   creating visible laser light pulses to represent pixels in an image;
   reflecting the visible laser light pulses off a scanning mirror to display the image on a projection surface;
   creating nonvisible laser light pulses;
   reflecting the nonvisible laser light pulses off the scanning mirror;
   receiving reflections of the nonvisible laser light;
   measuring a time-of-flight (TOF) of the reflections of nonvisible laser light to determine distances from the scanning display system to multiple points on the projection surface;
   averaging the distances from the scanning display system to the multiple points on the projection surface to determine an average distance from the scanning display system to the projection surface; and modifying angular extents of mirror deflection in response to the average distance from the scanning display system to the projection surface.

14. The method of claim 13 wherein modifying angular extents of mirror deflection in response to the average distance from the scanning display system to the projection surface comprises modifying the angular extents of mirror deflection to maintain a substantially constant image brightness.

15. The method of claim 13 wherein modifying angular extents of mirror deflection in response to the average distance from the scanning display system to the projection surface comprises modifying the angular extents of mirror deflection to maintain a substantially constant image size.

16. The method of claim 13 further comprising modifying the angular extents of mirror deflection to correct keystone distortion.

* * * * *